(12) United States Patent
Nakatsuka

(10) Patent No.: US 7,515,306 B2
(45) Date of Patent: Apr. 7, 2009

(54) DOCUMENT DISPLAY METHOD AND APPARATUS

(75) Inventor: Tadanori Nakatsuka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 10/760,318

(22) Filed: Jan. 21, 2004

(65) Prior Publication Data

US 2004/0179238 A1     Sep. 16, 2004

(30) Foreign Application Priority Data

Jan. 23, 2003    (JP)    ............... 2003-015231
Jan. 5, 2004     (JP)    ............... 2004-000507

(51) Int. Cl.
*G06K 15/00*     (2006.01)

(52) U.S. Cl. ............ 358/3.27; 358/2.1; 345/581; 345/611; 345/660; 345/472; 382/269

(58) Field of Classification Search .......... 358/2.1, 358/3.27; 382/301; 345/581, 611, 660, 619, 345/472
See application file for complete search history.

(56) References Cited

U.S. PATENT DOCUMENTS 5,537,495 A * 7/1996 Overton .............. 382/269
5,646,741 A * 7/1997 Horiuchi et al. ......... 358/3.27
5,649,034 A * 7/1997 Sonobe ................ 382/298
5,715,336 A * 2/1998 Tanaka ................ 382/301

FOREIGN PATENT DOCUMENTS

| JP | 05-030354 | 2/1993 |
| JP | 7-274001 | 10/1995 |
| JP | 11-275364 | 10/1999 |
| JP | 11-305752 | 11/1999 |
| JP | 2002-259960 | 9/2002 |

* cited by examiner

*Primary Examiner*—King Poon
*Assistant Examiner*—Jamares Washington
(74) *Attorney, Agent, or Firm*—Fitzpatrick, Cella, Harper & Scinto

(57) ABSTRACT

A document display method includes a determination step of determining, in a case that a display magnification of document data to be displayed is reduced, whether or not the display magnification of the document data is equal to or greater than a predetermined display magnification, and an applying step of applying smoothing processing to image data of the document data if it is determined that the display magnification of the document data is equal to or greater than the predetermined display magnification, and not applying the smoothing processing to the image data of the document data if it is determined that the display magnification of the document data is less than the predetermined display magnification. In addition, a display step displays the image data to which the smoothing processing has been applied in the applying step or the image data to which the smoothing processing has not been applied.

7 Claims, 12 Drawing Sheets

FIG. 7

SMOOTHING PROCESSING CONDITION

701: CHARACTERS

CONDITION 1 : DRAWING OBJECT IS AN IMAGE THAT INCLUDES CHARACTERS

DOCUMENT DISPLAY METHOD AND APPARATUS

FIELD OF THE INVENTION

This invention relates to a document display method and apparatus for displaying document data that includes an object such as a character, line art or image.

BACKGROUND OF THE INVENTION

In an apparatus that displays a document, such as a word processor utilizing a computer, a low-resolution device such as a monitor is utilized as a display device. Certain problems arise as a consequence. For example, the contour of a drawing object in an image is displayed in jagged fashion, or characters become illegible owing to loss of pixels due to downsampling of pixels in order to present a display from source image data. In order to solve these problems, the display is presented in such a manner that the object contour is smoothened as much as possible by smoothing or other processing, or it is so arranged that characters can be read even if pixels are missing.

With these methods, however, smoothing processing takes time and a display cannot be presented instantly in a case where, by way of example, the computer used has insufficient processing capability or the number of drawing objects is very large. Consequently, when a document is manipulated as by scrolling, the operation is not performed in a continuous manner and it may be difficult to carry out certain operations, e.g., it may be difficult to stop the screen at a desired position or to check the content of a document while scrolling it. The end result is a decline in operability and productivity.

SUMMARY OF THE INVENTION

Accordingly, an object of the present invention is to provide a document display method and apparatus in which additional processing is reduced and display presented at high speed by executing smoothing processing in a case where a fixed condition is satisfied, e.g., in a case where display magnification is greater than a certain threshold value.

According to the present invention, the foregoing object is attained by providing a document display method comprising:

a discrimination step of determining whether document data to be displayed satisfies a fixed condition;

a step of applying smoothing processing to image data, which is based upon the document data, if the condition has been satisfied; and a display step of displaying the image data.

Preferably, the fixed condition is that display magnification of the document data is equal to or greater than a fixed value.

Preferably, the fixed condition is that width of the drawing object in a document is equal to or greater than a certain threshold value and that height of the drawing object is equal to or greater than a certain threshold value.

Preferably, the fixed condition is that the area of the drawing object in a document is equal to or greater than a certain threshold value.

Preferably, the fixed condition is that the drawing object in a document is an image that contains characters.

Preferably, a determination as to whether the drawing object in the document is an image that contains characters is made based upon number of reversals between white and black counted while scanning the image.

Preferably, the fixed condition is that display magnification of the document data is equal to or greater than a fixed value and, moreover, area of the drawing object in the document is equal to or greater than a certain threshold value.

Preferably, the fixed condition is that display magnification of the document data is equal to or greater than a fixed value and, moreover, area of a drawing object being displayed in a displayable area is equal to or greater than a first threshold value, or that display magnification of the document data is less than the fixed value and, moreover, area of a drawing object being displayed in a displayable area is equal to or greater than a second threshold value.

As a result, if a document satisfies a fixed condition, the document can be displayed instantly even in a case where the apparatus has a low processing capability or the number of drawing objects is very large. This makes it possible to both speed up the display and maintain the image quality of the displayed image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram useful in describing an example of a smoothing processing condition at a step S42 of a fourth embodiment of the present invention;

DETAILED DESCRIPTION OF THE PREFERRED EMBODIMENTS

Preferred embodiments of the present invention will now be described in detail with reference to the drawings.

Figure 1:
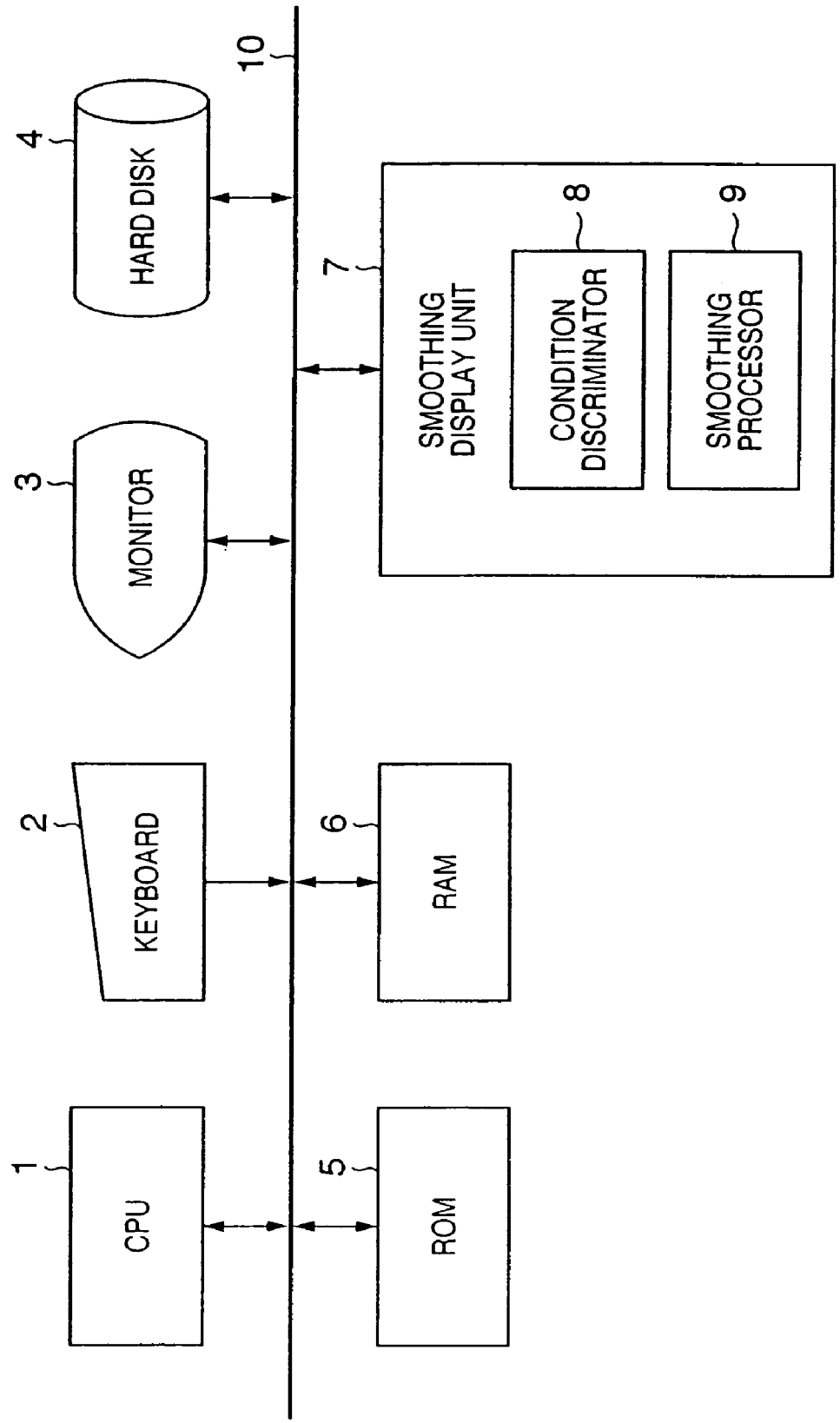
FIG. 1 is a block diagram illustrating the hardware implementation of a word processing apparatus embodying the present invention.

An example of a word processing apparatus according to the present invention is illustrated in FIG. 1.

As shown in FIG. 1, the word processing apparatus includes a CPU 1 for controlling the overall apparatus by executing a program; a keyboard 2 for data input; a monitor 3 such as a CRT or LCD for displaying a document image; a hard disk 4 for storing documents; a ROM 5 in which a program and necessary information for controlling the word processing apparatus are stored in advance; a RAM 6 utilized as various work areas; and a smoothing display unit 7 for applying smoothing to a document and displaying the results on the monitor 3, the smoothing display unit 7 having a condition discriminator 8 for determining whether smoothing processing should be executed or not, and a smoothing processor 9 for smoothing a drawing object. A data bus 10 is for transferring various data.

In this document display apparatus, the smoothing display unit 7 that includes the condition discriminator 8 and smoothing processor 9 is expressed as an independent unit. However, the smoothing display unit 7 can also be implemented by using the CPU 1 to execute a program that has been stored in the ROM 5. This program may be stored in the hard disk 4 as a file and may be executed upon being loaded in the RAM 6 as necessary.

Several embodiments of the invention will be described below but all are implemented by the arrangement shown in FIG. 1. A first embodiment will be described first.

First Embodiment

<Smoothing Processing and Display>

Figure 2:
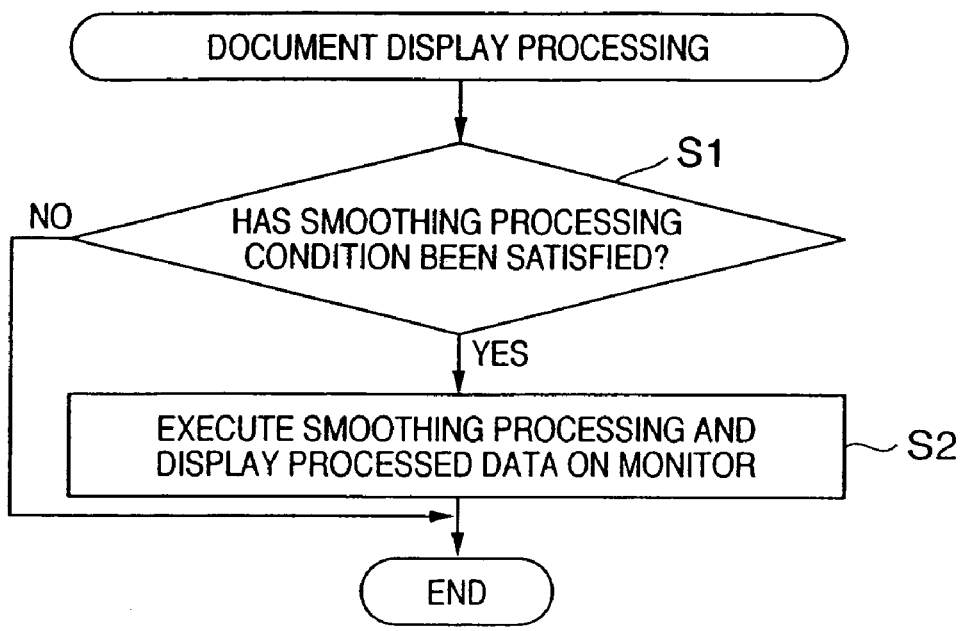
FIG. 2 is a flowchart illustrating the flow of smoothing display processing according to a first embodiment of the present invention.

FIG. 2 is a flowchart illustrating document display processing executed by the word processing apparatus of the present invention. Smoothing display processing executed by the above-mentioned word processing apparatus will be described in detail in each of the following embodiments.

The flowchart of FIG. 2 illustrates processing executed by the smoothing display unit 7 in a case where processing such as word processing is performed by having the CPU 1 execute the program that has been stored in the RAM 6 or ROM 5, and where the document to undergo such processing is displayed. The procedure can also be implemented by the CPU 1, as stated above. In the description that follows, it will be assumed that implementation is by the CPU 1. Before the processing of FIG. 2 is carried out, the CPU 1 extracts the document image of interest from within the hard disk 4 by means of a control program in ROM 5 (or RAM 6).

The extracted document image is discriminated at step S1 by the condition discriminator 8, which determines whether a smoothing processing condition relating to display magnification is satisfied or not.

In this embodiment, the condition is "Condition 1: display magnification is 51% or greater". Control proceeds to step S2 if the condition is satisfied. Processing is terminated if the condition is not satisfied. The display magnification mentioned here may be a display magnification designated from the screen of a user interface or the like. In a case where the word processing apparatus decides the magnification as by making the document image fit the size of the display screen, then the magnification decided by the word processing apparatus will be the display magnification. At step S1 it is judged whether the display magnification is equal to or greater than a certain threshold value (51% in this embodiment) or less than the threshold value.

The smoothing processor 9 executes smoothing processing at step S2 and displays the processed image data on the monitor 3. In this embodiment, smoothing is applied to bitmap data. If the document image that has been extracted from the hard disk has a format that is not that of bitmap data, therefore, the image is first expanded into the bitmap format and then smoothing processing is applied.

A variety of smoothing processing methods exist. For example, processing using a 3×3 mask may be applied to a monochrome binary image. This method involves scanning the image data from one edge in the order of the raster and referring to a pixel of interest and the eight pixels neighboring it, i.e., to the nine values of 3×3 pixels. If the number of black pixels in the area of the 3×3 pixels centered on the pixel of interest is five or more, the pixel of interest is made a black pixel. If the number of black pixels is four or less, then the pixel of interest is made a white pixel. The number of pixels masked is not limited to a 3×3. If similar processing is executed with regard to a fixed mask area that includes the pixel of interest, then smoothing processing having a different effect can be applied. In other words, imagine a fixed mask area that includes a pixel of interest, and let M represent the number of pixels within this area. Then, operation is as follows:

if (number of black pixels in mask area)$\geq$M/2 holds, then the pixel of interest is made a black pixel; and if (number of black pixels in mask area)<M/2 holds, then the pixel of interest is made a white pixel.

It should be noted, however, that if (number of black pixels) =M/2 holds, the pixel of interest may just as well be made a white pixel.

In a case where the image data to be processed represents a multivalued image, an available method is to replace the pixel of interest with an average value of pixel values in an area that includes the eight neighboring pixels. This method may be generalized by the above condition as follows:

value of pixel of interest=(total of pixel values in mask area)/M

Applying such processing smoothens the contour of the drawing object and makes it possible to mitigate the adverse effects of pixel downsampling in a display presented on a low-resolution device such as a monitor. In addition, this embodiment is such that in a case where the condition judged at step S1 is not satisfied, smoothing processing is skipped by utilizing the fact that the effect of smoothing is small when display magnification is low.

In a case where this smoothing condition is set permanently, then the condition is set in accordance with how low the display magnification must be in order for smoothing to have no effect. For example, in a case where the display magnification is 25% or the like, it can be judged that even if smoothing is applied, such smoothing will not have much effect. In this embodiment, therefore, it is so arranged that smoothing processing will not be executed if the magnification is less than 51%. Of course, the present invention is not limited by the threshold value (magnification) indicated in this embodiment. Further, the method of smoothing processing also is not limited by the method described above.

Figure 3:
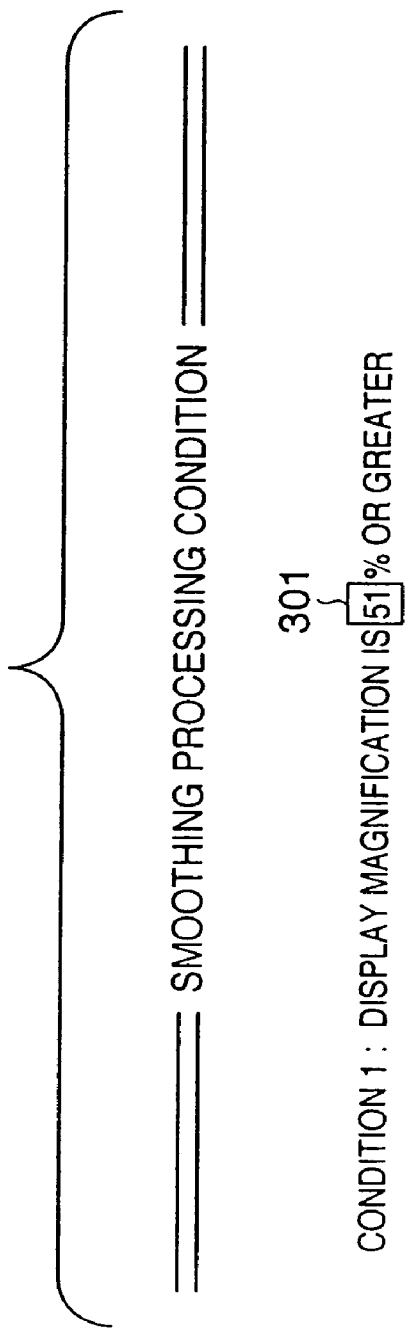
FIG. 3 is a diagram useful in describing an example of a smoothing processing condition at a step S1 of the first embodiment.

It should be noted that the smoothing condition can be made variable rather than fixed. FIG. 3 illustrates an example of a user interface for the purpose of specifying the condition in such case. As shown in FIG. 3, the user can set a desired display magnification in a setting box 301. The set value is recorded in the RAM or on the hard disk and is referred to at step S1 in FIG. 2 as the condition for performing smoothing.

Figure 10:
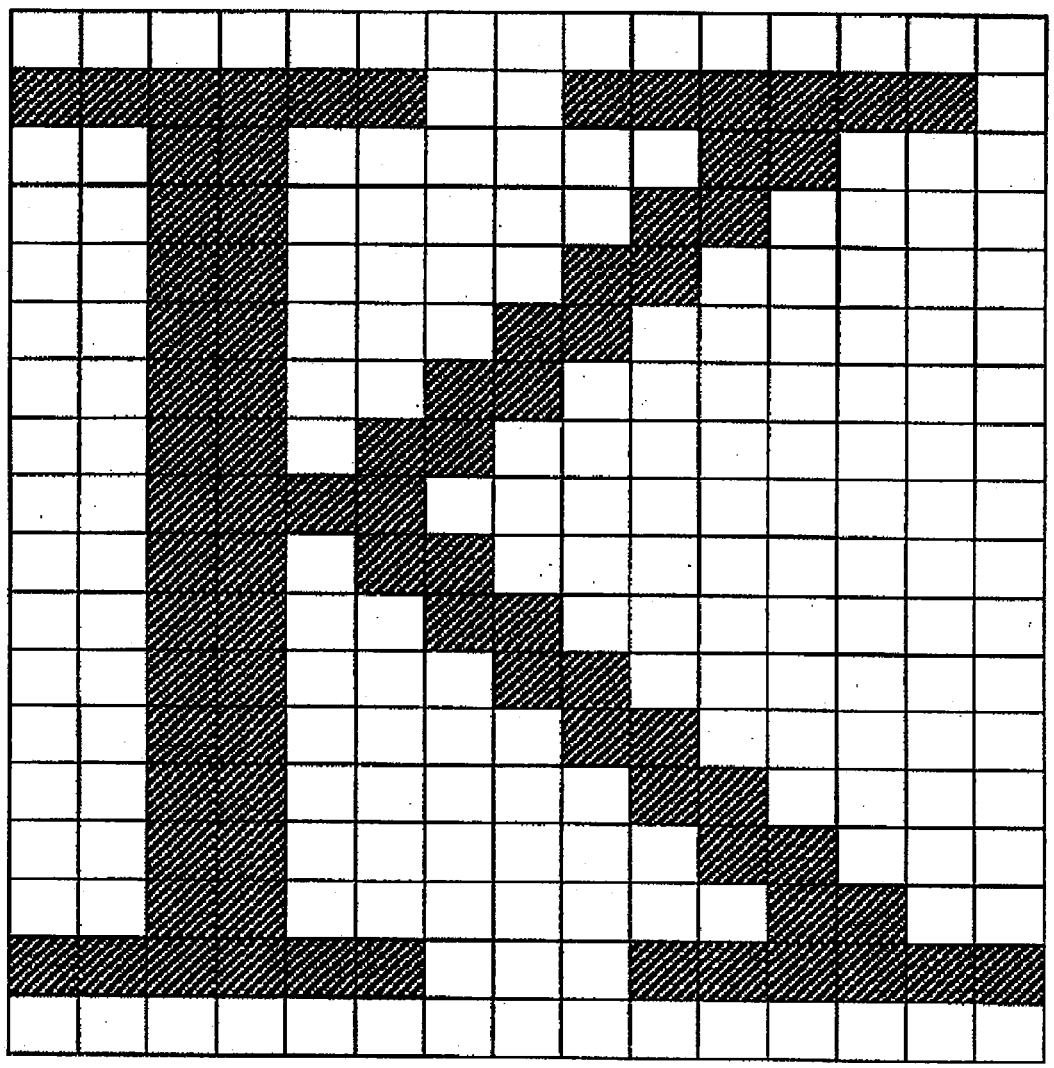
FIG. 10 is a diagram illustrating an example of a display without smoothing.
Figure 11:
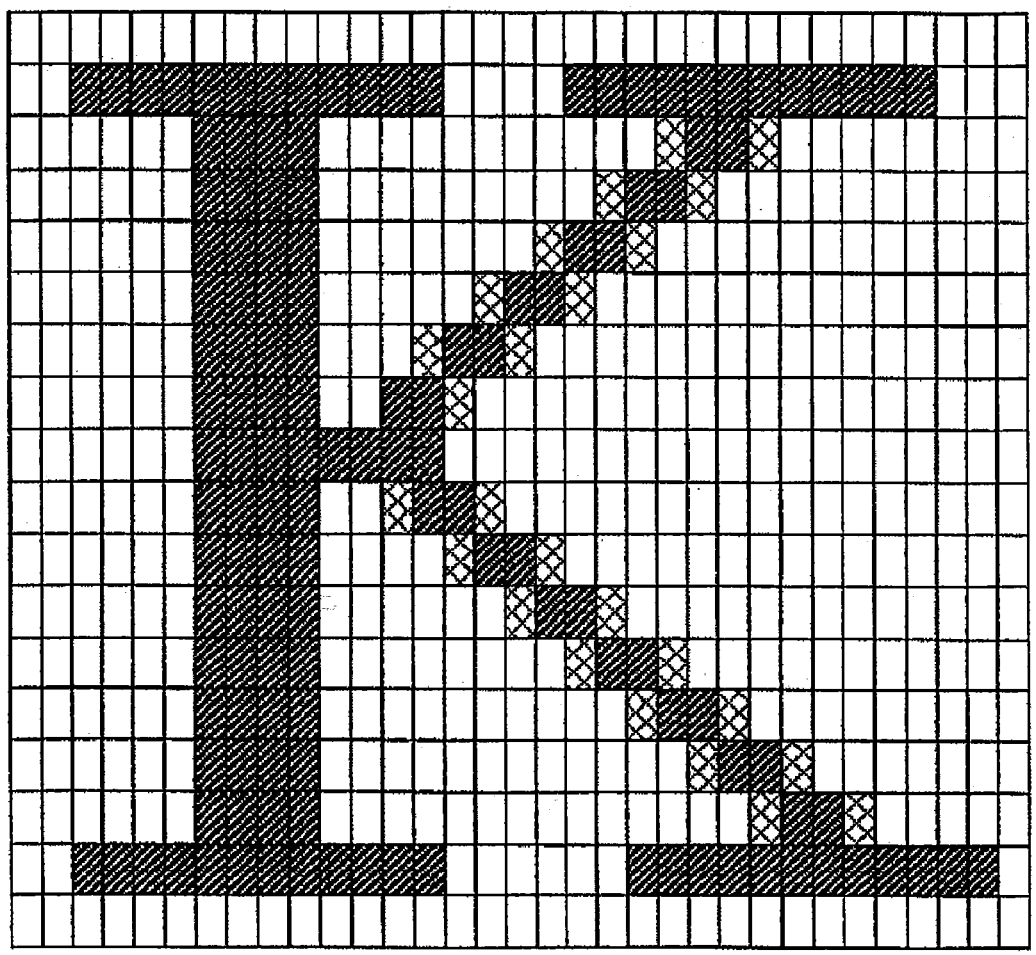
FIG. 11 is a diagram illustrating an example of a display with smoothing.

FIG. 10 illustrates an example of a display in a case where smoothing has not been applied, and FIG. 11 illustrates an example of a display in which smoothing has been applied.

In accordance with this embodiment, as described above, it is possible to provide a word processing apparatus in which a display can be presented instantly by skipping smoothing processing in cases where the display magnification is low, this being achieved even if the performance of the word processing apparatus is low or the number of drawing objects is very large.

Second Embodiment

A second embodiment of the present invention will now be described.

Figure 4:
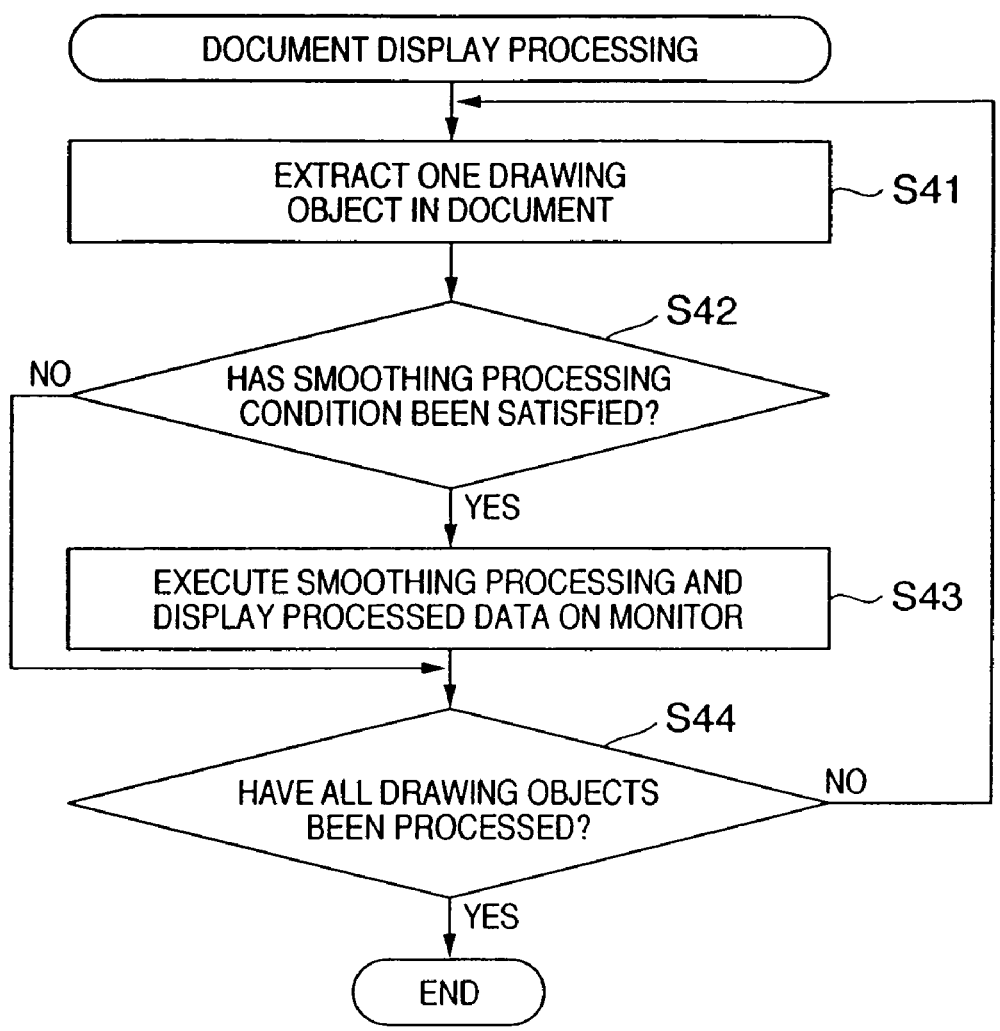
FIG. 4 is a flowchart illustrating the flow of smoothing display processing according to second and third embodiments of the present invention.
Figure 5:
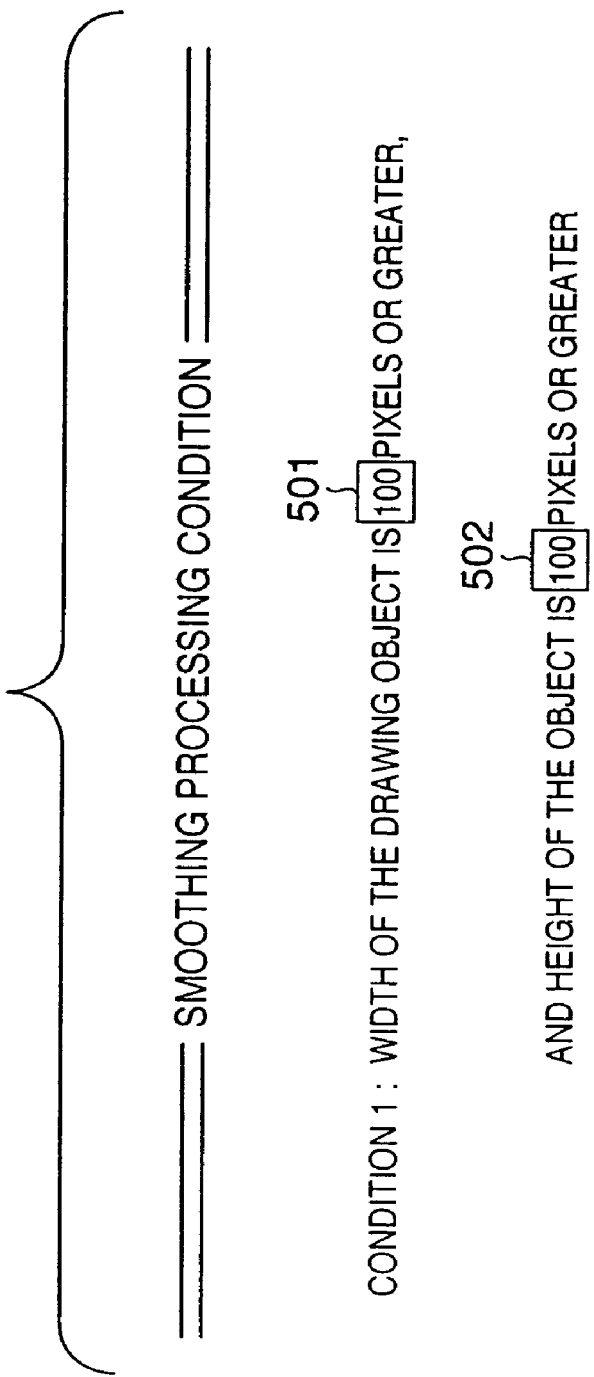
FIG. 5 is a diagram useful in describing an example of a smoothing processing condition at a step S42 of a second embodiment of the present invention.

FIG. 4 is a flowchart of document display processing performed by a document processing apparatus in a second embodiment of the present invention. This procedure is executed instead of that indicated by the flowchart of FIG. 2 according to the first embodiment. FIG. 5 illustrates a smoothing processing condition used by the condition discriminator 8 at step S42 in the flowchart of FIG. 4. In FIG. 5, setting boxes 501 and 502 are displayed on a user interface and the user can set the condition by entering a desired value in each of these boxes. Of course, fixed values may be applied if desired.

Before the processing of FIG. 4 is carried out, the CPU 1 extracts the document image of interest from within the hard disk 4 by means of a control program in ROM 5.

Next, at step S41 in FIG. 4, one drawing object (an image, graphic or text, etc., which shall be referred to as a "drawing object of interest") in the document is extracted from the document data, which has been read out of the hard disk 4 and expanded temporarily in the RAM 6, at step S41 in FIG. 4 by the smoothing display unit 7, and the object is stored in the RAM 6.

Next, at step S42, the condition discriminator 8 determines whether the drawing object of interest extracted at step S41 satisfies the smoothing processing condition. FIG. 5 illustrates an example of the smoothing processing condition. In the example of FIG. 5, the smoothing condition is "width of the drawing object of interest after expansion is 100 pixels or greater, and height of the object is 100 pixels or greater". Control proceeds to step S44 if the condition is not satisfied. Of course, the present invention is not limited by the value of the smoothing condition mentioned above.

By way of example, if the width of the drawing object of interest is 400 pixels and the height thereof is 200 pixels, the smoothing condition will be satisfied and, hence, control proceeds to step S43.

At step S43, the drawing object of interest that has been expanded into bitmap data is subjected to smoothing processing by the smoothing processor 9 and the smoothed object is displayed on the monitor 3. Since the smoothing processing involves that computation be performed pixel by pixel, as already mentioned above, displaying the object takes time. Accordingly, in this embodiment, it is determined at step S42 to skip smoothing processing by utilizing the fact that the effect of smoothing is small when the drawing object is small.

Next, it is determined at step S44 whether all drawing objects have been processed. This step also is executed by the smoothing display unit 7. If the decision rendered is "YES", processing is exited. If the decision rendered is "NO", then control returns to step S41 one unprocessed drawing object is extracted from the document and processing continues.

Thus, in accordance with this embodiment, it is possible to provide a document display apparatus in which a display can be presented instantly even if the processing capability of the word processing apparatus is low or the number of drawing objects is very large. This is achieved by utilizing the fact that the effect of smoothing a small drawing object is small and skipping smoothing processing on a per-drawing-object basis if the size of the drawing object is less than a certain size.

Third Embodiment

A third embodiment of the present invention will now be described.

Figure 6:
FIG. 6 is a diagram useful in describing an example of a smoothing processing condition at a step S42 of a third embodiment of the present invention.

FIG. 6 illustrates another smoothing processing condition used by the condition discriminator 8 at step S42 in the flowchart of FIG. 4. In this example, the determination at step S42 is made on the assumption that the condition is "area of the drawing object is 5000 square pixels or greater". Smoothing processing is executed if his condition is satisfied.

By way of example, if the drawing object of interest after expansion into bitmap data has a width of 400 pixels and a height of 20 pixels, the area of the object will be 8000 square pixels and the condition will be satisfied. Control therefore proceeds to step S43. Processing other than that of step S42 is similar to that of the second embodiment.

Thus, in accordance with this embodiment, it is possible to provide a document display apparatus in which a display can be presented instantly even if the processing capability of the word processing apparatus is low or the number of drawing objects is very large. This is achieved by utilizing the fact that the effect of smoothing a small object is small and skipping smoothing processing if the area of the drawing object is less than a certain area.

In FIG. 6, a setting box 601 is displayed on a user interface and the user can set the condition by entering a desired value in this box. Of course, fixed values may be applied if desired.

Fourth Embodiment

A word processing apparatus according to a fourth embodiment of the present invention will now be described. The word processing apparatus of this embodiment executes the processing of the flowchart of FIG. 4 by an arrangement identical with that of the word processing apparatus according to the second embodiment. It should be noted that the smoothing condition judged at step S42 in FIG. 4 is different. The smoothing processing condition according to this embodiment is "drawing object of interest is an image that includes characters".

For example, if the drawing object of interest is an image and characters are included in this image, then this condition will be satisfied. Control therefore proceeds to step S43. Processing other than that of step S42 is similar to that of the second embodiment.

There are a variety of discrimination methods for determining whether an image includes characters. One such example will now be described by way of example.

Figure 8:
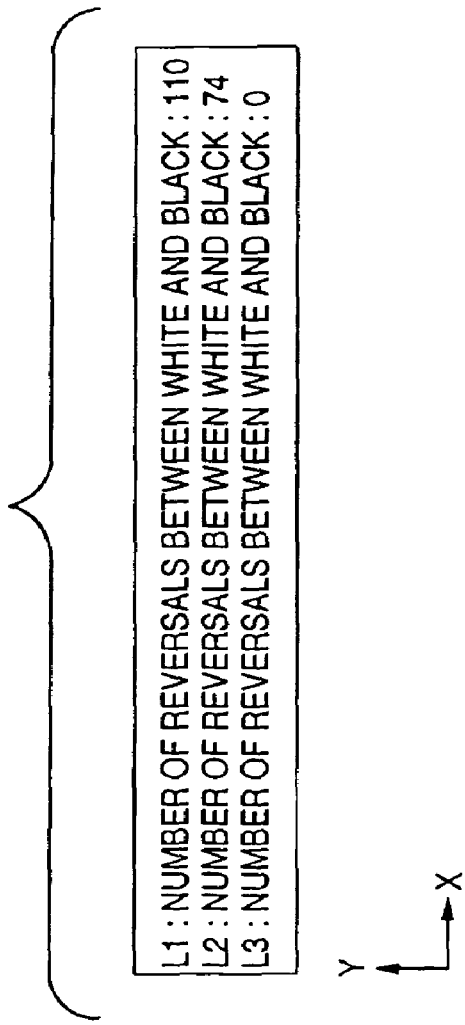
FIG. 8 is a diagram useful in describing the principle of character-string discrimination according to the fourth embodiment.

FIG. 8 illustrates a drawing object to be processed. This object is a monochrome binary image. The number of times the value of a pixel undergoes a reversal from white to black or from black to white is counted from left to right in the order of the raster along lines Y=L1, Y=L2, Y=L3 every suitable number of lines (a height obtained by dividing the object by four in FIG. 8) with regard to the height direction (assumed to be the Y direction below) of this binary image. In the example of FIG. 4, the number of reversals between white and black pixels is as follows for each line:

Y=L1: 110 times
Y=L2: 74 times
Y=L3: 0 times

The largest number of reversals is found among these and if the number exceeds a certain threshold value (e.g., 30), then a decision is rendered to the effect that characters are included.

In this example, the largest number of reversals is 110 on line L1. Since this value is greater than the threshold value of 30, the above-mentioned condition is satisfied and it is judged that the area includes characters.

On the other hand, if a "NO" decision is rendered, i.e., if there is no line for which the number of times a pixel value reverses exceeds 30, then a similar decision is rendered with regard to the vertical direction. The reason for this is that characters can be written vertically in the Japanese language. In the vertical direction, therefore, the number of times a pixel reverses from a white pixel to a black pixel or from a black pixel to a white pixel is similarly examined in the vertical direction and it is determined whether the maximum number has exceeded the above-mentioned threshold value. Thus, it can be determined whether the area includes characters. Other processing is similar to that of the second embodiment.

Figure 9:
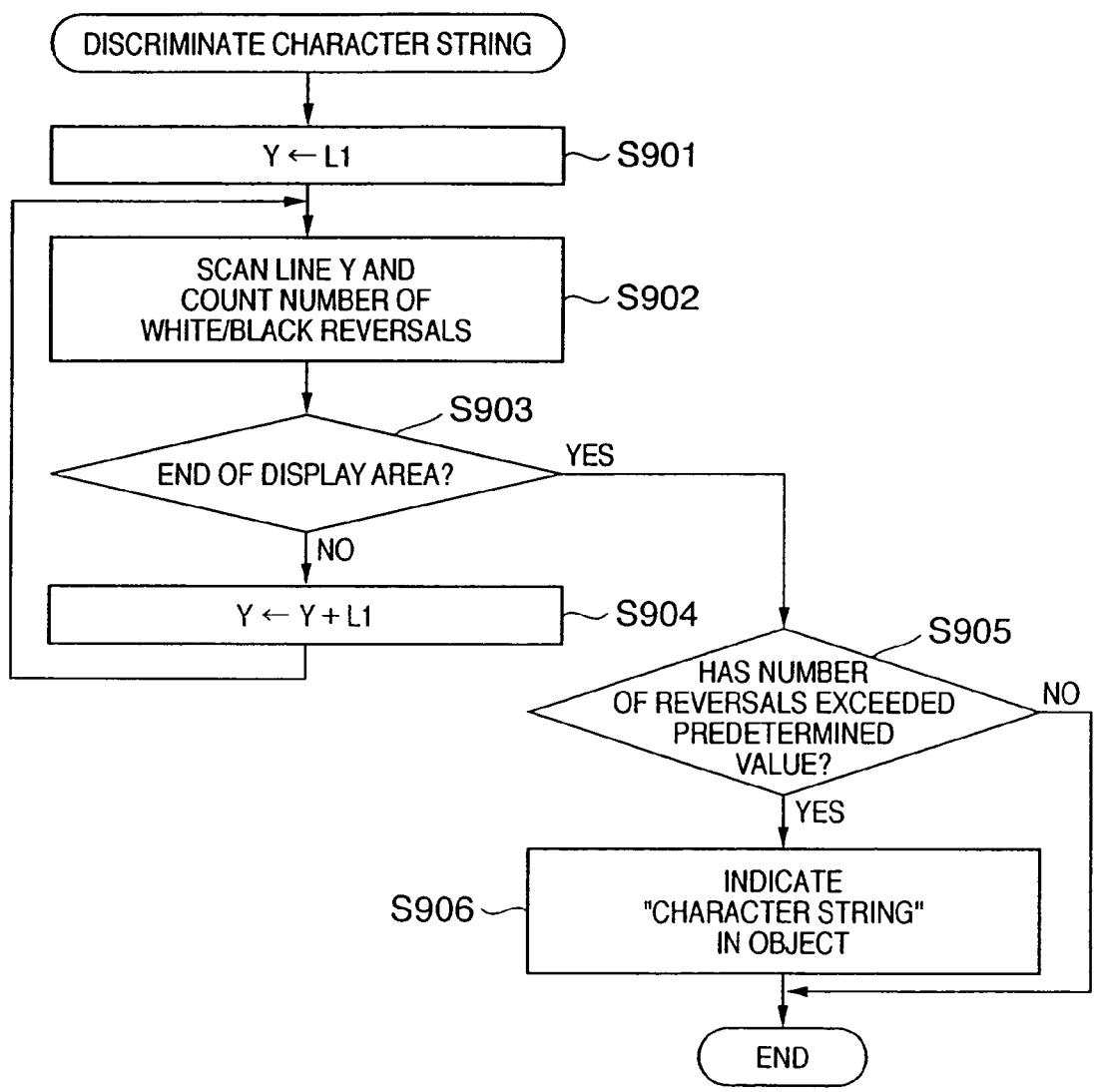
FIG. 9 is a flowchart illustrating the flow of processing for character-string discrimination processing according to the fourth embodiment.

FIG. 9 illustrates processing for determining whether an image includes characters. Though the image data to undergo discrimination may be the entirety of the image data that has been extracted, it is more efficient if the discrimination processing is applied only to an area having a certain degree of black-pixel density. Further, with regard to characters of such size that execution of smoothing processing cannot be expected, the spacing between the lines along which the number of reversals is counted, such as lines L1 and L2, should be selected such that it will be difficult to discriminate such characters as characters. For example, if the height of a character to undergo smoothing is H dots, then, by adopting H/2 lines as the spacing between the lines along which the number of reversals is counted, characters that are smaller than a fixed standard can be excluded from smoothing.

With reference to FIG. 9, first L1 is entered as the initial value of line spacing Y (S901). Next, the line Y (the Yth line) is scanned and the number of reversals between white and black pixels is counted (S902). It is then determined whether scanning of the entire area of the image to be displayed has been completed (S903). Here it is determined that scanning is finished if the remaining number of lines is less than L1.

If scanning is not finished, control proceeds to step S904, where L1 is added to Y. The next line is then scanned and the number of reversals between white and black pixels is counted.

If scanning has been completed, the number of reversals is compared with the above-mentioned reference value in regard to the line for which the number of reversals is largest (S905). If the reference value is exceeded, then the fact that a character string is included in the drawing object of interest is indicated in association with the object as by a flag or the like (S906). It should be noted that although the reference value is 30 in the example above, this value should of course be changed depending upon the size of the image. Accordingly, the reference value can also be given not as an absolute value but as a number (i.e., density) that pertains to the unit length of the lines scanned. For example, the number of reversals between white and black pixels per scanning line of 100 mm or 400 dots, etc., is given in advance. It may be so arranged that this value can be set by the user. Alternatively, since the size of a character that exhibits the effect of smoothing can be decided in general, the value may be given as a fixed value in advance.

Further, according to this embodiment, it is assumed that the smoothing processing condition is a character string in an image object. However, the user can be allowed to set the smoothing processing condition. An example of such a user interface is illustrated in FIG. 7. A setting box 701 included in this user interface is a menu item that makes it possible to select a condition candidate such as "character", "line art" or "character and line art". The item selected by the user is adopted as the smoothing processing condition. Whether this condition has been satisfied is discriminated at step S42 in FIG. 4.

In accordance with this embodiment, it is possible to provide a word processing apparatus in which smoothing processing can be skipped in a case where a drawing object is not an image that includes characters, as a result of which a display can be presented instantly even in a case where the number of drawing objects is very large.

Further, rapid smoothing processing can be implemented because whether or not an image contains characters and the size of the characters can be discriminated simultaneously.

Fifth Embodiment

The processing operations relating to each of the foregoing four embodiments have been described separately. However, it is also possible combine and execute a plurality of these processing operations. For example, smoothing processing conforming to display magnification described in the first embodiment can be combined with smoothing processing conforming to display area described in the third embodiment, thereby making it possible to realize an ideal display with more efficient processing.

In this embodiment, processing for a case where a plurality of the embodiments have been combined will be described with reference to FIG. 10 as a fifth embodiment. Processing for a case where the first and third embodiments have been combined will be described as one example.

Figure 12:
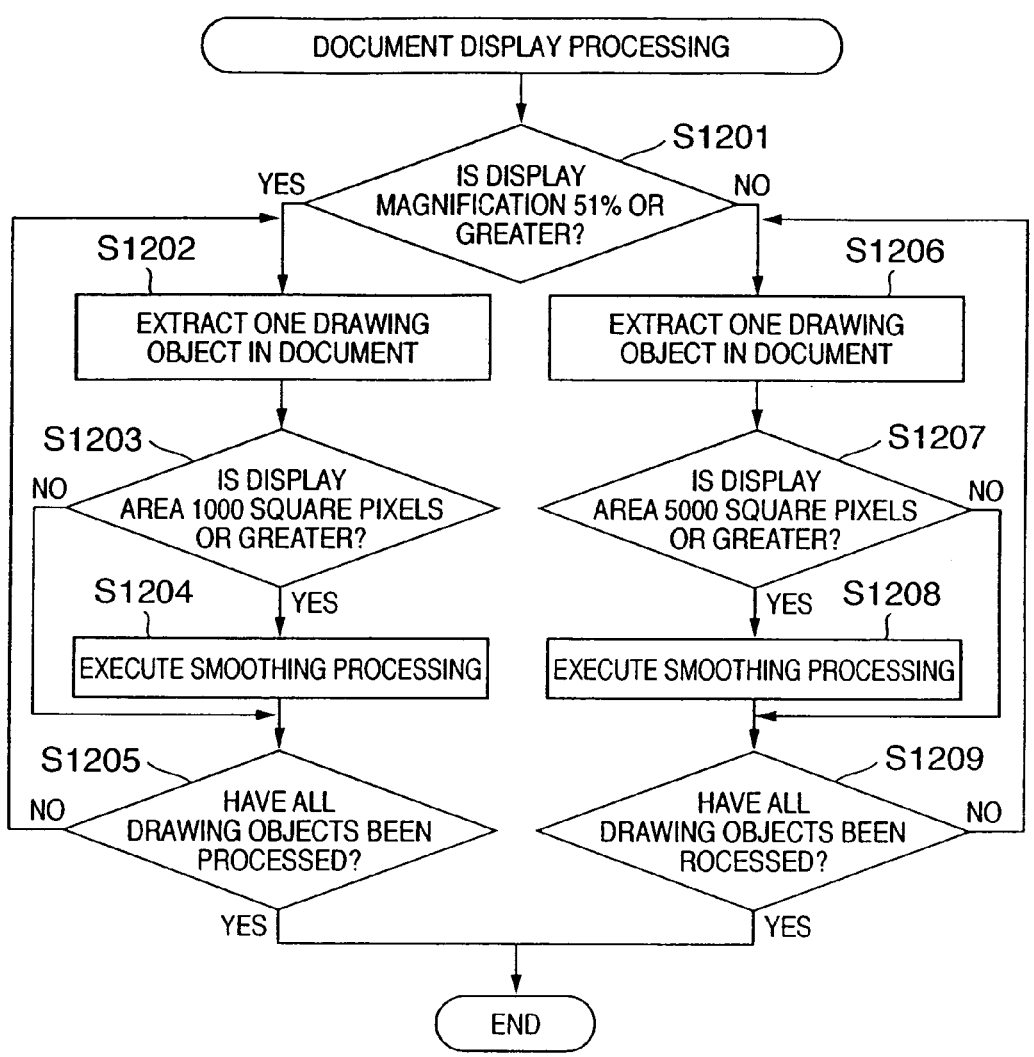
FIG. 12 is a flowchart illustrating the flow of smoothing processing according to a fifth embodiment of the present invention.

A determination as to whether to perform smoothing based upon display magnification in the first embodiment and a determination as to whether to perform smoothing based upon display area in the third embodiment are combined. FIG. 12 illustrates the flow of smoothing processing executed by the smoothing display unit 7 according to the fifth embodiment.

First, it is determined at step S1201 whether the display magnification is equal to or greater than a predetermined threshold value (e.g., 51%). If the display magnification is equal to or greater than the threshold value, an object being displayed in the display area is extracted (S1202) and the display area of the object is calculated (S1203). Only an object for which the calculated display area is equal to or greater than a predetermined threshold (i.e., a first threshold) value (e.g., 1000 square pixels) is judged to be the object of smoothing at step S1203 and this object is subjected to smoothing processing (S1204). It is determined at S1205 whether all objects have been processed. If there is an object for which the comparison between area and threshold value has not been performed, control returns to step S1202 and processing continues. If comparison and judgement of all objects has been completed, then processing is exited.

If the decision rendered at step S1201 is that the display magnification has not attained the predetermined threshold value, an object being displayed in the display area is extracted (S1206) and the display area of this object is calculated (S1207). Only an object for which the calculated display area is equal to or greater than a predetermined threshold (i.e., a second threshold) value (e.g., 5000 square pixels) that is different from the first threshold value (1000 square pixels in the above example) for the case where the display magnification is equal to or greater than the threshold value is judged to be the object of smoothing and this object is subjected to smoothing processing (S1208). It is determined at S1209 whether all objects have been processed. If there is an object for which the comparison between area and threshold value has not been performed, control returns to step S1206 and processing continues. If comparison and judgement of all objects has been completed, then processing is exited.

According to the fifth embodiment, by selecting and using an area threshold value, which decides whether or not smoothing will be applied, in dependence upon the display magnification, it is possible to provide a smoothing function that is more effective in comparison with the case where the arrangement of the first or third embodiment is used independently.

Though an example in which the first and third embodiments are combined has been described above, the present invention is not limited solely to this combination.

Though not specifically pointed out in the description of five embodiments above, it goes without saying that the present invention is executed with regard to objects displayed on a display device such as a monitor for displaying document data or in a displayable area such as a user-interface screen for display purposes. For example, the calculation of area carried out in the third embodiment is executed with regard to an object a part of which is being displayed in display area. If part of an object is not being displayed in a display area, then the area of the part not displayed need not be calculated.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Thus, in accordance with the present invention as set forth in the above embodiments, it is possible to provide a document display method and apparatus in which a display can be presented instantly by skipping smoothing processing with regard to a case where a fixed condition is not satisfied or with regard to a drawing object that does not satisfy the condition. Thus the instant display can be achieved even if the performance of a word processing apparatus is inadequate or the number of drawing objects to be processed is very large.

The present invention is not limited to the above embodiments and various changes and modifications can be made within the spirit and scope of the present invention. Therefore, to apprise the public of the scope of the present invention, the following claims are made.

What is claimed is:

1. A document display method comprising:
    a first determination step of determining, in a case that a display magnification of document data to be displayed is reduced, whether or not the display magnification of the document data is equal to or greater than a predetermined display magnification;
    a second determination step of determining whether or not an area of a drawing object displayed in a displayable area is equal to or larger than a first threshold;
    an applying step of applying smoothing processing to image data of the document data if it is determined that (i) the display magnification of the document data is equal to or greater than the predetermined display magnification, and (ii) the area of the drawing object displayed in the displayable area is equal to or larger than the first threshold, and not applying the smoothing processing to the image data of the document data if it is determined that (i) the display magnification of the document data is equal to or larger than the predetermined display magnification, and (ii) the area of the drawing object displayed in the displayable area is smaller than the first threshold; and a display step of displaying the image data to which the smoothing processing has been applied in said applying step or the image data to which the smoothing processing has not been applied.

2. The method according to claim 1, wherein the image data of the document data contains a character image.

3. A document display apparatus comprising:

first determination means for determining, in a case that a display magnification of document data to be displayed is reduced, whether or not the display magnification of the document data is equal to or greater than a predetermined display magnification;

second determination means for determining whether or not an area of a drawing object displayed in a displayable area is equal to or larger than a first threshold;

means for applying smoothing processing to image data of the document data if it is determined that (i) the display magnification of the document data is equal to or greater than the predetermined display magnification, and (ii) the area of the drawing object displayed in the displayable area is equal to larger than the first threshold, and not applying the smoothing processing to the image data of the document data if it is determined that (i) the display magnification of the document data is equal to or larger than the predetermined display magnification, and (ii) the area of the drawing object displayed in the displayable area is smaller than the first threshold; and display means for displaying the image data on a display unit to which the smoothing processing has been applied or the image data to which the smoothing processing has not been applied.

4. A computer-readable recording medium on which a program for causing a document to be displayed by a computer has been recorded, said program having:

first program code for determining, in a case that a display magnification of document data to be displayed is reduced, whether or not the display magnification of the document data is equal to or greater than a predetermined display magnification;

second program code for determining whether or not an area of a drawing object displayed in a displayable area is equal to or larger than a first threshold;

program code for applying smoothing processing to image data of the document data if it is determined that (i) the display magnification of the document data is equal to or greater than the predetermined display magnification, and (ii) the area of the drawing object displayed in the displayable area is equal to or larger than the first threshold, and not applying the smoothing processing to the image data of the document data if it is determined that (i) the display magnification of the document data is equal to or greater than the predetermined display magnification, and (ii) the area of the drawing object displayed in the displayable area is smaller than the first threshold; and program code for displaying the image data on a display unit to which the smoothing processing has been applied in said applying step or the image data to which the smoothing processing has not been applied.

5. The method according to claim 1, wherein said applying step further applies smoothing processing to image data of the document data if it is determined that (i) the display magnification of the document data is less than the predetermined display magnification, and (ii) the area of the drawing object displayed in the displayable area is equal to or larger than a second threshold that is greater the first threshold, and not applying the smoothing processing to the image data of the document data if it is determined that (i) the display magnification of the document data is less than the predetermined display magnification, and (ii) the area of the drawing object displayed in the displayable area is smaller than the second threshold.

6. The apparatus according to claim 3, wherein said applying means further applies smoothing processing to image data of the document data if it is determined that (i) the display magnification of the document data is less than the predetermined display magnification, and (ii) the area of the drawing object displayed in the displayable area is equal to or larger than a second threshold that is greater the first threshold, and not applying the smoothing processing to the image data of the document data if it is determined that (i) the display magnification of the document data is less than the predetermined display magnification, and (ii) the area of the drawing object displayed in the displayable area is smaller than the second threshold.

7. The recording medium according to claim 4, wherein said program code for applying smoothing processing further applies smoothing processing to image data of the document data if it is determined that (i) the display magnification of the document data is less than the predetermined display magnification, and (ii) the area of the drawing object displayed in the displayable area is equal to or larger than a second threshold that is greater the first threshold, and not applying the smoothing processing to the image data of the document data if it is determined that (i) the display magnification of the document data is less than the predetermined display magnification, and (ii) the area of the drawing object displayed in the displayable area is smaller than the second threshold.

* * * * *